Oct. 8, 1940.                W. F. OHME ET AL                2,217,324
                                SPRAYING DEVICE
              Original Filed Aug. 23, 1934          2 Sheets-Sheet 1

Inventor
Walter F. Ohme and
Ray C. Stephan

By Caswell & Lagaard
Attorneys

Oct. 8, 1940.  W. F. OHME ET AL  2,217,324
SPRAYING DEVICE
Original Filed Aug. 23, 1934   2 Sheets-Sheet 2

Inventor
Walter F. Ohme and
Ray C. Stephan
By Caswell & Lagaard
Attorney

Patented Oct. 8, 1940

2,217,324

UNITED STATES PATENT OFFICE 2,217,324

SPRAYING DEVICE

Walter F. Ohmé and Ray C. Stephan, Minneapolis, Minn., assignors to North Star Specialty & Manufacturing Company, Minneapolis, Minn., a corporation of Minnesota Original application August 23, 1934, Serial No. 741,078. Divided and this application October 7, 1936, Serial No. 104,475

3 Claims. (Cl. 299—141)

Our invention relates to spraying devices and particularly to spraying devices used in conjunction with machines for washing drinking vessels, which machines include a support, and a rack moveably mounted on the support and by means of which the vessels are carried past the spraying device.

An object of the invention resides in providing a device utilizing both hot and cold water.

Another object of the invention resides in providing a device by means of which the vessels are sprayed both upon the interior and exterior thereof.

A still further object of the invention resides in providing a spraying device which can be readily manufactured and at a nominal cost.

An object of the invention resides in providing a spraying device comprising a manifold connected to a suitable supply of water and provided with removable caps forming individual sprays.

A feature of the invention resides in the arrangement of the sprays.

Another object of the invention resides in the construction of the manifold and in the arrangement of the parts thereof.

A feature of the invention resides in the specific construction of the sprays.

An object of the invention resides in supporting the upper and lower sprays so as to form a single spray unit.

Other objects of the invention reside in the novel combination and arrangement of parts and in the details of construction hereinafter illustrated and/or described.

Figures 1, 3:
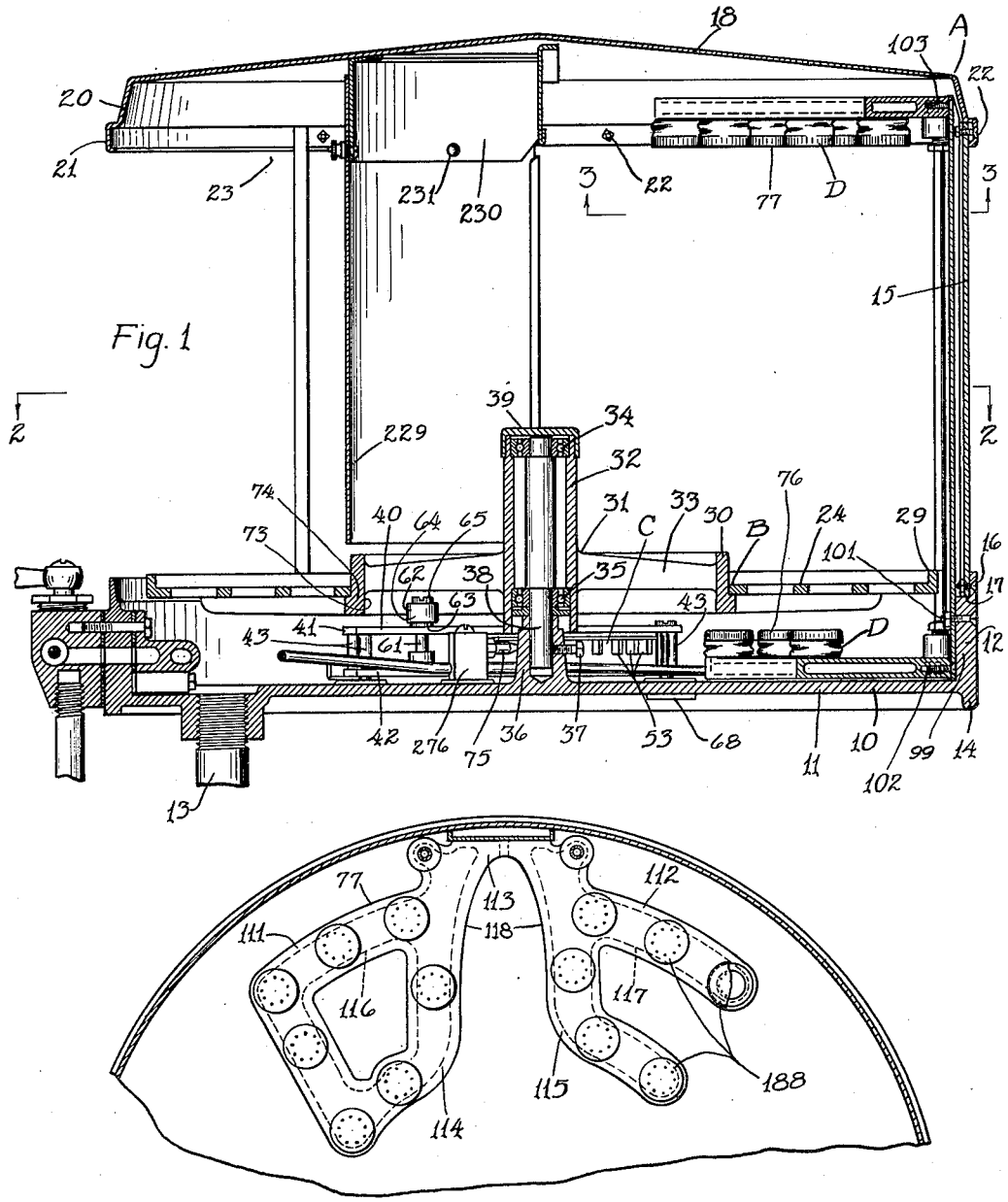
Fig. 1 is a medial elevational sectional view of a machine for washing drinking vessels illustrating an embodiment of my invention.
Fig. 3 is a fragmentary inverted plan sectional view taken on line 3—3 of Fig. 1.

This application for patent is a division of our copending application for patent for Machine for washing drinking vessels, Serial Number 741,078, filed August 23, 1934.

In order to fully explain the construction and operation of the invention, the spraying device has been shown as embodied in a machine for washing drinking vessels and only so much thereof as will be needed to explain the instant invention will be described.

The machine for washing drinking vessels herein illustrated comprises a housing which we have indicated in its entirety by the reference character A and in which the spraying device of the invention is installed. The washing mechanism of the invention comprises a revoluble rack B which is driven through a water motor C. The invention proper comprises a spraying device D which is adapted to spray hot and cold water on the glasses carried by the rack as the same is rotated past the sprays. These various parts will now be more fully described.

The housing A consists of a tray 10 circular in form which is constructed with a bottom 11 having a rim 12 extending upwardly therefrom. The bottom 11 is preferably sloping toward the forward portion of the tray where a drain 13 is provided by means of which the water discharged into the housing may be removed from the device. At the outer margin of the bottom 11 is provided a ledge 14 which elevates the bottom 11 above the surface on which the machine rests. This ledge may, if desired, be formed in continuation of the rim 12 of said tray. The tray 10 is constructed as a casting or the same may be spun from sheet metal or constructed in any other suitable manner. The housing A further comprises a circular wall 15, which is secured to the rim of the tray 10 and extends upwardly therefrom. The lower edge of this wall rests in a recess 17 formed in said rim. The wall 15 is preferably attached to said rim through small bolts 16 which pass through suitable openings in both said rim and wall. Upon the upper end of the wall 15 is placed a cover or closure 18 which is circular throughout the extent thereof. This closure is provided with a flange 20 which extends downwardly therefrom and which terminates at its lower end in a lip 21 by means of which the closure may be secured to the wall 15. This is accomplished through bolts 22 which pass jointly through said wall and lip the same as the bolts 16. The wall 15 is of lesser circular extent than a complete circle so that an opening 23 is provided at the front of the housing through which access may be had to the interior thereof and to the drinking vessels placed upon the rack B mounted therein.

The rack B consists of a table 24 which is constructed with a number of circularly disposed concentrically arranged rings 25, 27 and 28. These rings are connected together through radially extending bars 26 to form a reticulate structure on which the drinking vessels or other dishes to be washed may be placed. The rings 25, 27 and 28 and the bars 26 all lie in a common horizontal plane so as to form a suitable support for the drinking vessels. The outer ring 27 is provided with an upwardly extending flange 29 by means of which the drinking vessels are held upon the rack.

The table 24 is rotatably supported on a spider 31 which comprises a central tubular hub 32 connected to a circular flange 30 through radially extending arms 33. The hub of this spider has mounted in it ball bearings 34 and 35 which are disposed at the upper and lower ends thereof. In the center of the bottom 11 of tray 10 is provided a boss 36 which has secured to it through a set screw 37 an upwardly extending post 38. Post 38 is turned to receive the inner races of the two bearings 34 and 35. By means of the two bearings 34 and 33 the spider 31 is rotatably mounted. A cap 39 secured to the upper end of the hub 32 covers the bearings 34 and prevents the entry of water into said bearings from above. The table 24 rests upon arms 133 extending outwardly from the flange 30 of spider 31 and is centered with respect to the axis thereof through said flange.

The flange 30 similar to flange 29 extends upwardly above the surface of the table 24 to hold articles positioned thereon in place. To further serve this purpose a guard 229 is employed which is constructed from sheet metal bent in cylindrical form with a curvature substantially equal to the curvature of the flange 30. This guard is bolted to a mounting 230 by means of bolts 231 and may be easily removed when access into the interior of the machine is desired. Mounting 230 may be soldered or otherwise secured to the cover 18.

Figure 2:
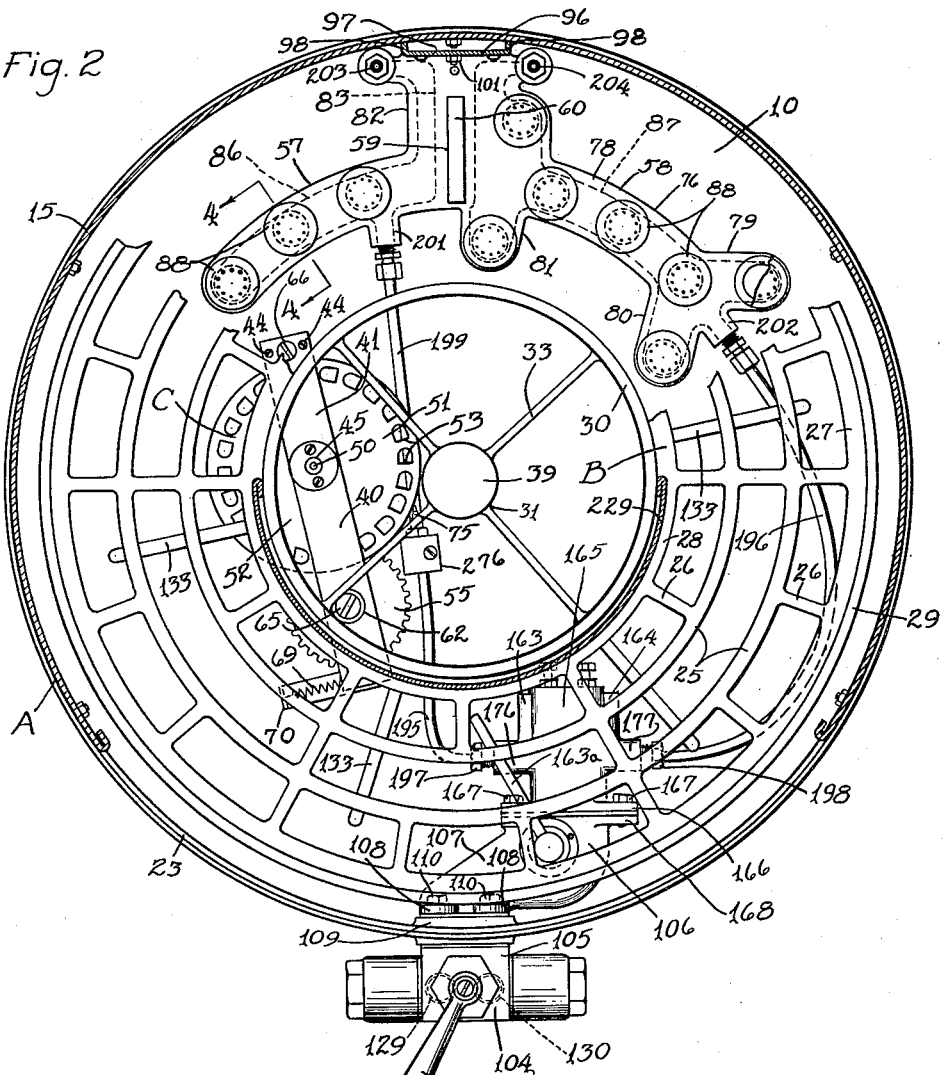
Fig. 2 is a plan sectional view taken on line 2—2 of Fig. 1 with a portion of the rack broken away.

The water motor C and the power transmission associated therewith are illustrated in Figs. 1 and 2. This part of the invention includes a frame 40 which comprises two spaced parallel bearing plates 41 and 42 held in spaced relation through posts 43. These posts are riveted to the plate 42 and the plate 41 is secured to said posts through screws 44 threaded into said posts. In the two plates 41 and 42 are mounted two self-lubricating bearings 45 which are attached to said plates in any suitable manner. In the bearings 45 is rotatably mounted a shaft 50. Shaft 50 has attached to it a water wheel 51. This wheel is constructed from a sheet of metal which is arranged to form a back 52 which is cut at its outer periphery to provide a plurality of blades 53 extending substantially radially with respect to the wheel. The shaft 50 drives another shaft 61 (Fig. 1) through a gear train 55 consisting of a number of arbors pivoted between the plates 41 and 42 and carrying intermeshing gears and pinions. Such construction forming no particular feature of the instant invention has not been shown in detail, applicant's original application for patent from which this application is divided being relied upon for disclosure thereof.

The shaft 61 is mounted for rotation in bearings formed in the two plates 41 and 42. The upper end of the said shaft projects above the plate 41 and has attached to it a friction pinion 62. This pinion comprises a core 63 on which a short section of a rubber tube 64 is applied, which tube is held in position on said core through a screw 65 threaded into said core. When the screw 65 is properly tightened, the tube 64 is held from movement and the pinion 62 functions in the desired manner.

The frame 40 is mounted for swinging movement relative to the bottom 11 of tray 10 in the following manner: Extending through the two plates 41 and 42 is a bolt 66 which is screwed into a boss 68 formed on the bottom 11. This bolt supports the entire frame for swinging movement clear of the bottom 11. The frame 40 is urged outwardly through a tension spring 69 which is attached at one end to the plate 42 and at its other end to an angle member 70 serving as a spring anchor. This angle member is attached to the bottom 11 in any suitable manner. The arms 33 of spider 31 are disposed toward the upper end of the flange 30 leaving the inner surface of said flange indicated at 73 unobstructed. The portion of the flange 30 having the surface 73 constitutes a friction gear with which the friction pinion 62 may engage. This gear is designated in its entirety by the reference numeral 74. From an inspection of Fig. 2 it will be noted that the pinion 62 is disposed at such an elevation as to engage the surface 73 of gear 74. Through the action of the spring 69 the pinion 62 is urged into frictional engagement with gear 74 and rotation of the rack B through the action of the water motor C is procured.

The water motor C further includes a nozzle 75 which is connected with a source of supply of water and which is attached to a mounting 276. The nozzle 75 is fixed in position and is adapted to direct a stream of water tangentially upon the blades 53 of the water wheel 51. This causes the wheel 51 to rotate and gear 62 is correspondingly rotated at a reduced rate of speed through the action of the gear train 55. Due to the fact that the nozzle 75 is directly supported on the tray 11 a rigid pipe connection may be utilized for supplying water to the same and frame 40 on which the motor C is supported may swing freely to bring the pinion 62 into proper frictional engagement with its corresponding gear 74 without interference. This eliminates a flexible water pipe or connection for the motor.

For the purpose of spraying water upon the glasses carried on the rack B, the spraying device D constituting the subject matter of this invention is used. This spraying device comprises two spray units indicated at 76 and 77. Spray unit 76 is disposed below the rack B and spray unit 77 is situated above said rack.

Figure 4:
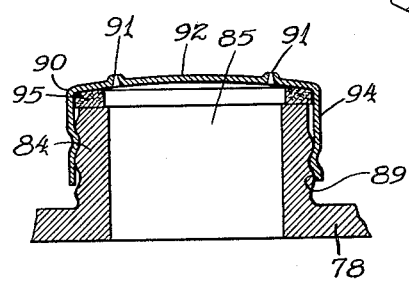
Fig. 4 is a sectional detail view taken on line 4—4 of Fig. 2 and drawn to an enlarged scale.

The spray unit 76 consists of an arcuate hollow manifold 78 which is constructed with two arcuate parts 57 and 58. The part 58 has three laterally extending branches 79, 80 and 81 and the two parts are connected together by means of a neck 82. Branches 79 and 80 are arranged in forked relation. In the middle of the neck 82 is provided a partition 83 which separates the two parts 57 and 58, providing two separate chambers 86 and 87 within the interior of the manifold. In the center of this partition is formed an opening 59 which extends along said partition. A heat insulating block 60 is disposed in this opening and retards the passage of heat from each of the parts 57 and 58 to the other. At suitable localities on the parts 57 and 58 of the manifold 78 and at the ends of the branches 79, 80 and 81 are provided sprays 88 which are adapted to direct fine sprays of water upwardly for the purpose of washing the vessels placed upon the rack B from beneath said vessels. These sprays and the sprays used with spray unit 77 are all constructed in the same manner and only one of said sprays will be described in detail which is best illustrated in Fig. 4.

On the manifold 78 at the required locality is provided an upwardly extending boss 84. This boss is constructed with an opening 85 passing through the same and communicating with the chamber 87 within the manifold. The boss 84 is threaded upon the exterior as designated at 89 to receive a screw cap 90. Cap 90 is preferably formed from sheet metal and is constructed with a closure 92 having a number of openings 91 through the same and through which the water passes in fine streams. Said cap is further constructed with a threaded flange 94 adapted to screw upon the threads 89 to hold the cap attached to the said boss. A gasket 95 placed between the closure 92 and the end of the boss 84 serves to maintain a tight connection between the screw cap and the boss.

The upper spray unit 77 is constructed similarly to the unit 76 and comprises an arcuate manifold 118 constructed to form two separated sections 111 and 112 which follow the contour of the housing A and which are connected together by a neck 113. The manifold 111 has a looped branch 114 issuing from it and the manifold 112 has a bent branch 115 issuing from it. These manifolds and branches are constructed hollow to provide chambers 116 and 117 within the same which do not communicate with one another. Extending downwardly from the two manifolds are sprays 188 identical with the sprays 88 of the unit 76. The description of the construction of these sprays will hence not be repeated.

The two spray units 76 and 77 are supported in the following manner: Attached to the rim 12 of tray 10 is an upright 96 formed of sheet metal which is bent to provide a back 97 and two outwardly extending flanges 98. This upright is bolted to a rectangular lug 99 formed on the said rim which projects inwardly into the pan 10. For this purpose a bolt 101 is employed which extends jointly through said lug, rim and upright. The flanges 98 engage this lug and hold the upright in proper position. Upright 96 serves to support both the lower and upper spray units 76 and 77. The lower unit 76 is threaded to receive a machine screw 102 which passes through the said back 97 of the upright 96 and which is screwed into unit 76. The unit 77 is similarly attached to the upper end of the upright 96 through another screw 103, which passes through the back 97 of said upright and which is threaded into the neck 113 thereof.

For the purpose of shutting off the hot and cold water to the sprays, a shut-off valve mechanism 104 is employed which is mounted at the front of the tray 10. Upon the interior of the tray is provided a control valve 106, which is disposed directly opposite the valve mechanism 104. The valve mechanism 104 includes a valve housing 105 and the control valve 106 includes a housing 107. These two housings are attached to the rim 12 of tray 10 in the following manner: Upon the valve housing 107 are formed two lugs 108. Two cap screws 110 pass through these lugs and through a flattened portion 109 of the rim 12 and are threaded into the housing 105 of the valve mechanism 104. For regulating the pressure of the water delivered to the spray units 76 and 77 twin pressure regulating valves 163 and 164 are employed. These valves are contained within a valve housing 165 which is formed with a flange 166 at one end thereof. The valve housing 165 is bolted to the valve housing 107 through bolts 167, which extend through the flange 166 and are threaded into a similar flange 168 formed on the housing 107.

Two water pipes 129 and 130 are connected to the valve mechanism 104 and deliver cold and hot water to the spray units 76 and 77. The valve mechanism 104 utilizes a handle 147 by means of which the flow of both hot and cold water to the sprays is simultaneously regulated. The cold and hot water is separately delivered to the control valve 106 which is provided with a handle 163a by means of which both cold and hot water may be delivered to the two regulating valves 163 and 164 or by means of which hot water only may be delivered to said valves. The construction of the valve mechanisms 104, 106, 163 and 164 forming no particular feature of the present invention has not been shown or described, the disclosure in the parent case being relied on for this purpose.

For the purpose of leading water to the various sprays, two flexible tubes 195 and 196 are employed which are connected by means of tube connections 197 and 198 to two bosses 176 and 177 formed on the case 165. A branch tube 199 is also connected to the tube 195 and is connected to a connection 201 formed on the part 57 of manifold 78 of the lower spray unit 76. This boss is so situated that tube 199 communicates with chamber 86 within the same. Tube 196 is similarly connected to a connection 202, formed on the part 58 of said manifold by means of which said tube is brought into communication with the chamber 87 of said manifold. The two corresponding chambers 116 and 117 of the upper manifold 118 are connected to the chambers 86 and 87 by means of two vertically extending tubes 203 and 204, which extend along the upright 96 and are protected and guarded thereby. These tubes are connected to the manifolds 78 and 118 in the same manner as the tubes 199 and 196. In this manner water is delivered from the lower spray unit to the upper spray unit, hot water being provided on the right hand side, and cold water on the left hand side.

The operation of the invention is as follows: Valve handle 163a is first turned so that hot and cold water is directed into the two pressure regulating valves 163 and 164. Handle 147 is next turned on, which delivers both hot and cold water to these valves. When the pressure in these valves reaches a predetermined amount, water is delivered through the tubes 195, 199 and 196 to the spraying device and to the water motor C. The control valve 106 is so designed that cold water is delivered to the water motor C and to the part 57 of manifold 78 and so that hot water is delivered to the part 58 of manifold 78. The water motor C is now started and through the friction pinion 62 and the friction gear 74 drives the rack B. At the same time, sprays of hot and cold water are directed upwardly from the unit 76 and downwardly from the unit 77. These sprays wash drinking vessels which are placed upon the rack B both internally and externally. The gear train used in conjunction with the motor C is so designed that the rack B rotates counter-clockwise as viewed in Fig. 2. This causes the drinking vessels to first pass the part 58 of unit 76 and the part 112 of unit 77 which sprays the drinking vessels with hot water. As the drinking vessels pass these parts and arrive at the part 57 of unit 77, they are sprayed with cold water. This cools the drinking vessels so that when the same reach the opening 23 in the housing A they are sufficiently cool for immediate use. It hence becomes unnecessary to let the drinking vessels stand before using for the purpose of cooling the same. When the drinking vessels appear opposite the opening 23 in the housing A the same may be withdrawn. If the operator should fail to remove the drinking vessels no particular harm is done as they merely pass through the machine a second time and are further cleaned. When it is desired to wash the drinking vessels solely with hot water, the handle 163a is turned in the opposite direction to that shown in Fig. 2 and hot water is then directed to all of the sprays and to the motor as well.

Our invention is highly advantageous in that an extremely practical device is provided whereby drinking glasses and similar vessels may be quickly and easily washed. By the arrangement of the sprays the drinking vessels are thoroughly washed both within and without. An extremely simple and practical construction is provided for forming the individual sprays by means of which water is directed upon the vessels passing between the sprays. By means of the construction disclosed, two spray units can be employed which are disposed one above the other and between which the glasses travel. These spray units can be constructed as castings and are supported and connected together in an extremely simple and efficient manner. The various sprays of the units are arranged in a manner to procure the greatest efficiency and to wash the drinking vessels both upon the interior and the exterior and from both ends of the same. The parts though constructed as a single casting, are separated from one another so as to prevent heat loss from the hot water to the cold water.

Changes in the specific form of our invention, as herein disclosed, may be made within the scope of what is claimed without departing from the spirit of our invention.

Having described our invention, what we claim as new and desire to protect by Letters Patent is:

1. A spraying device comprising a central neck, an arcuate part issuing from one side of the central neck, a second arcuate part issuing from the other side of the central neck and lying in continuation of the first part said second part having branches at the end arranged in forked relation, a partition extending across said central neck and dividing the interior of the manifold into two compartments, water conduits communicating with said respective compartments, one of said conduits being connected to said manifold between the forked branches, and sprays on the various arcuate parts and branches.

2. A spraying device comprising a one-piece relatively flat hollow manifold having a central neck and a plurality of branches extending outwardly therefrom in several directions, sprays on said branches, a partition in the central neck dividing the manifold into two compartments, some of the sprays being in communication with one compartment and others with the other compartment, hot and cold water conduits connected to the manifold and adapted to communicate one with each compartment, a support for the manifold attached to said neck and an insulating member disposed in said partition and heat insulating one of said compartments from the other.

3. A spraying device comprising a one-piece relatively flat hollow manifold having a central neck and a plurality of branches extending outwardly therefrom in several directions, sprays on said branches, a partition in the central neck dividing the manifold into two compartments, some of the sprays being in communication with one compartment and others with the other compartment, hot and cold water conduits connected to the manifold and adapted to communicate one with each compartment, a support for the manifold attached to said neck, said partition having an opening extending therethrough, and a heat insulating block disposed within said opening and heat insulating one compartment from the other.

WALTER F. OHME.
RAY C. STEPHAN.